United States Patent [19]

Bleuel et al.

[11] Patent Number: 4,662,968
[45] Date of Patent: May 5, 1987

[54] METHOD AND APPARATUS FOR PREPARING FLAT RIBBON CABLE

[75] Inventors: Eric P. Bleuel, Westmont; Timothy R. Ponn, Aurora, both of Ill.

[73] Assignee: Molex Incorporated, Lisle, Ill.

[21] Appl. No.: 755,112

[22] Filed: Jul. 15, 1985

[51] Int. Cl.⁴ .................................. H02G 1/12
[52] U.S. Cl. ........................ 156/250; 156/510; 29/564.4; 81/9.51
[58] Field of Search ............ 156/247, 248, 250, 268, 156/510, 46, 49; 29/564.4; 81/9.51

[56] References Cited

U.S. PATENT DOCUMENTS

| | | | |
|---|---|---|---|
| 2,521,688 | 9/1950 | Cataldo et al. | 81/9.51 |
| 3,748,932 | 7/1973 | Neiman et al. | 29/564.4 |
| 4,228,709 | 10/1980 | Guzay et al. | 29/564.4 |
| 4,276,798 | 7/1981 | Gottschalk | 81/9.51 |
| 4,442,587 | 4/1984 | Shields et al. | 29/564.4 |

Primary Examiner—Caleb Weston
Attorney, Agent, or Firm—Louis A. Hecht; John W. Cornell

[57] ABSTRACT

Disclosed is a method and apparatus for notching a flat multi-conductor ribbon cable of the type having an encapsulating shielding medium completely surrounding each cable conductor and filling the spaces therebetween, and an outer jacket surrounding the encapsulating medium. According to the method, the outer jacket and the shielding medium are cut along two spaced-apart lines generally transverse to the conductors. Thereafter, the jacket and the shielding medium are cut along spaced-apart lines parallel and immediately adjacent to each conductor, thereby forming a plurality of slugs which are pushed from between adjacent conductors to expose the conductors in the termination region.

The above-described method is carried out in an apparatus having blades which cut the jacket and the resilient medium along the transverse spaced-apart lines. Blade-like notching members have a width corresponding to the space between adjacent conductors, and a lower cable engaging surface which includes an extended cutting edge and a recessed surface which pushes the slug from the termination region.

17 Claims, 7 Drawing Figures

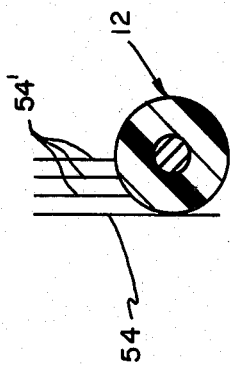
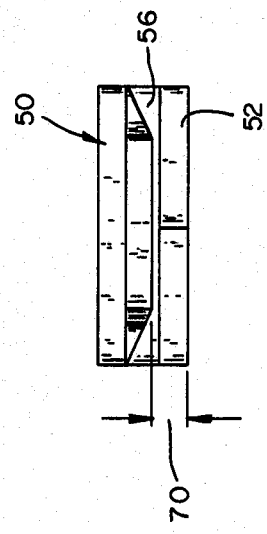
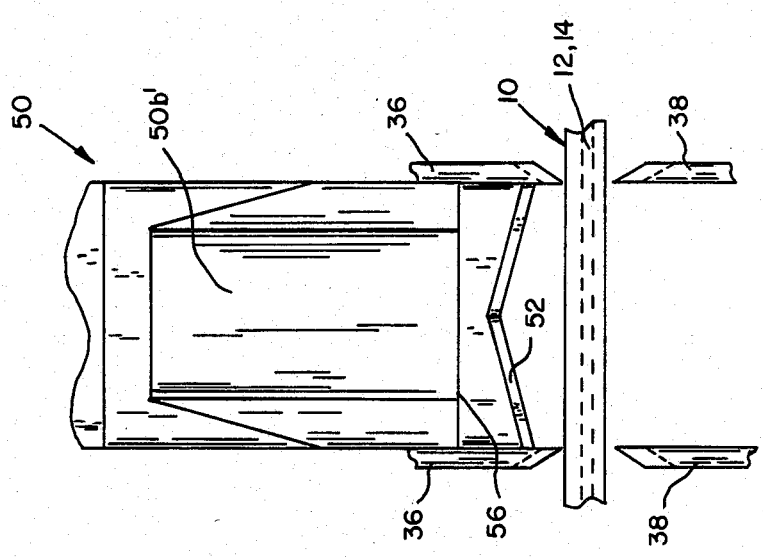

METHOD AND APPARATUS FOR PREPARING FLAT RIBBON CABLE

BACKGROUND OF THE INVENTION

1. Field of the Invention

This invention pertains to methods and apparatus for preparing flat ribbon cables for termination by removing a portion of the outer cable insulation. More particularly, the present invention pertains to the notching of a flat ribbon cable to allow termination at a point remote from the cable ends.

2. Brief Description of the Prior Art

Flat ribbon cables are extensively used in many areas of electronic machine manufacture. For example, they are employed to interconnect various circuit boards and other modules within computer systems. Several techniques have been employed for terminating flat ribbon cables, such as preparing the cable ends with grinding wheels or stripping blades to bare the individual conductors of the cable, in preparation for a solder securement to a printed circuit board or the like.

However, it has often been found convenient to also terminate the flat ribbon cable at a point remote from the cable ends. This "daisy chain" technique is typically employed with mass termination electrical connectors having insulation displacing terminals.

Typically, flat ribbon cables are constructed to have a plurality of spaced-apart conductors, with a common dielectric insulating jacket surrounding the conductors and filling the spaces therebetween to form webs of insulation material. Conventional cable notching processes employ tool punches which remove only the insulating webs between adjacent conductors, leaving a resulting cylindrical sheath of conductor insulation. These processes produce cable portions which approximate the geometry of a discrete insulated wire having a circular outer periphery.

Economic considerations dictate that all notching of a given cable termination region be performed simultaneously. However, this creates undesired stresses in the cable, particularly with small gauge electrical conductors, in that a significant distorting force is applied to the cable conductors during the punching operation. Further, these punching operations have not been found to be satisfactory to produce a bare wire, if one is required in the notched area.

One example of a notching operation that can be used to produce bar conductors is described in U.S. Pat. No. 4,442,587 wherein a pair of opposed, rotatably driven grinding wheels abrade the outer cable insulation. In this operation, the insulation on the bottom of the cable is pushed in one direction, while the insulation on the top of the ribbon cable is pushed in the other direction, with the grinding wheels being moved transversely across the cable. It is possible, during the grinding operation, that the outer surface of the cable conductors would be damaged, a particularly undesireable risk when wires are topcoated with precious or corrosion-resistant metals.

Recently, objections have been raised against flat ribbon cables which radiate undesireable signal emissions during operation of electronic equipment. Various arrangements for shielding flat ribbon cables have been provided to reduce the level of signals emitted from a cable conductor, to electrically isolate it from other sources, and to protect the cable from sudden electrostatic discharge.

A particular type of shielded cable, commonly identified as a transmission cable, has carefully controlled electrical characteristics such as a matched impedance, and a low capacitance. Control over impedance and capacitance can be provided only with close manufacturing tolerances of the shielded cable. One example of a shielded cable having these desireable electrical properties is described in commonly owned U.S. patent application Ser. No. 032,360 filed Apr. 23, 1979, abandoned. The cable includes a plurality of spaced-apart insulated conductors and at least one bare conductor used as a drain wire. The insulated conductors and the bare drain conductor are embedded in a condutive polymer substrate, comprising an integral homogenous encapsulating medium which surrounds the conductors and the spaces therebetween. Surrounding the conductive polymer substrate is a conventional outside insulation jacket which is either laminated or extruded around the cable subassembly. The conductor insulation employed in the cable to surround the individual cable conductors can be a conventional polymeric insulation, such as polyvinyl chloride, or may be a thin varnish coating applied to the cable conductor.

Previous cable notching arrangements cannot be satisfactorily applied to the conductive polymer shield cable, due to the presence of the encapsulating conductive substrate which must be entirely removed from the prepared cable area to prevent shorting between adjacent terminals. The punching method described above would leave layers of conductive material on the top and bottom of each cable conductor, and the aforementioned grinding preparation techniques would leave conductive material between adjacent cable conductors. Further, the above-described grinding techniques could not be employed if the cable is to be terminated in a connector having insulation displacing terminals.

Even if the grinding techniques of removing cable insulation could otherwise be employed, the risk of damaging a varnish or other delicate wire coating would prohibit their use.

SUMMARY OF THE INVENTION

It is therefore an object of the present invention to provide an improved apparatus and method for preparing a flat ribbon cable for termination to an electrical connector having insulation displacing terminals.

Another object of the present invention is to provide a method and apparatus for preparing a shielded flat ribbon cable having an integral homogenous conductive polymer substrate encapsulating the cable conductors and filling the spaces therebetween.

Yet another object of the present invention is to provide a method and apparatus of notching a flat ribbon cable quickly and easily without generating undue stresses in the cable conductors.

These and other objects of the present invention are provided in a method of preparing a flat multi-conductor cable by removing material between conductors to form a termination region, said cable including a planar array of axially extending, spaced-apart, parallel conductors with an encapsulating medium completely surrounding each conductor and filling the spaces therebetween, and an outer jacket surrounding said encapsulating medium, the method comprising the steps of cutting said outer jacket and said encapsulating medium along two spaced-apart lines generally transverse to said conductors, to define the length of said region; cutting said jacket and said encapsulating medium along spaced-apart lines parallel to and immediately adjacent to said conductors, whereby a plurality of slugs of said length are produced, said slugs comprising portions of said jacket and said encapsulating medium; and pushing said slugs from between adjacent conductors to expose said conductors in said termination region.

The above-described method can also be directly applied to a flat, shielded multi-conductor cable having a conductive shielding medium completely surrounding each conductor and filling the spaces therebetween. The jacket and the encapsulating shielding medium are cut along spaced-apart lines parallel to and immediately adjacent to the outer insulation of an insulated conductor, or the outer surface of the bare conductor of the cable assembly.

The objects of the present invention are also attained in an apparatus for preparing a flat shielded multi-conductor cable which removes material between conductors to form a termination region, said cable including a planar array of axially extending, spaced-apart, parallel conductors with a conductive shielding medium completely surrounding each conductor and filling the spaces therebetween, and an outer jacket surrounding said shielding medium, the apparatus comprising: means for cutting said outer jacket and said shielding medium along two spaced-apart lines generally transverse to said conductors to define the length of said region; means for cutting said jacket and said shielding medium along spaced-apart lines parallel to and immediately adjacent to said conductors whereby a plurality of slugs of said length are produced, said slugs comprising portions of said jacket and said shielding medium; and means for pushing said slug from between adjacent conductors to expose said conductors in said termination region.

BRIEF DESCRIPTION OF THE DRAWINGS

In the drawings, wherein like elements are referenced alike,

FIGS. 3a and 3b are side elevational views corresponding to FIGS. 2a and 2b respectively;

FIG. 4 is an end view of the cutting blades of FIGS. 2 and 3; and

FIG. 5 is a sectional view of a conductor of the cable indicating alternative cut lines.

DETAILED DESCRIPTION OF THE PREFERRED EMBODIMENT

Figure 1:
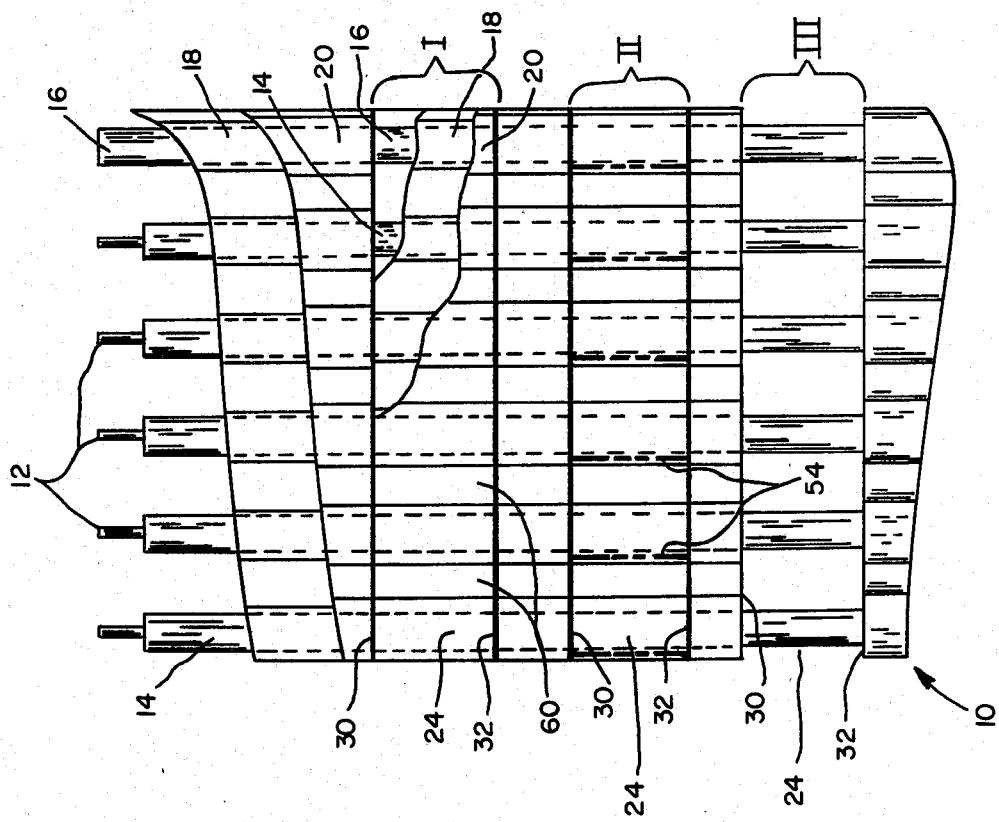
FIG. 1 is a plan view showing the steps of the present invention applied to a shielded flat ribbon cable having an integral homogenous conductive polymer substrate encapsulating each cable conductor, and filling the spaces therebetween.

Referring now to the drawings, and in particular to FIG. 1, a flat ribbon cable assembly, generally indicated at 10 is of the type described in commonly owned U.S. patent application Ser. No. 032,360 filed Apr. 23, 1979, abandoned, the disclosure of which is herein incorporated by reference to the extent necessary for an understanding of the present invention. Cable assembly 10 includes a plurality of linear, parallel, spaced-apart conductors 12 having a thin cladding or coating of insulation 14 formed thereon. The assembly 10 also includes at least one bare conductor 16 which is spaced apart with respect to the other conductors 12. It is to be noted that more than one bare conductor 16 can be provided according to given customer requirements, and that conductor 16 can be of the metallic or conductive polymer type.

The conductors 12, and their insulation claddings 14, along with bare conductors 16, are embedded in a conductive polymer substrate 18. Substrate 18 is an integral, homogenous encapsulating medium surrounding all of the insulation-cladded and bare conductors 12 and 16, including the spaces therebetween. Substrate 18 can be made of any suitable plastic such as polyvinyl chloride impregnated with a conductive material such as carbon black or metallic particles.

Assembly 10 is provided with a usual outside insulation jacket 20 of polyvinylchloride or other suitable insulation material capable of being laminated or extruded. The insulation cladding 14 is relatively thin compared to the cross section of conductor 12, and can comprise a conventional thin polymeric insulation covering, or in the alternative, a relatively thin varnish coating.

Referring again to FIG. 1, roman numeral I indicates a termination region 24 prior to cable preparation of the present invention, lying between spaced-apart transverse lines 30,32. In the portion of cable assembly 10 indicated by roman numeral II, the outer jacket 20 and the encapsulating medium 18 have been cut along lines 30,32 by blades somewhat resembling conventional wire stripping blades, as will be explained below. In a second and final step, indicated by roman numeral III, the outer jacket 20 and encapsulating medium 18 extending between lines 30,32 has been entirely removed, leaving the insulation clad conductors 12 and the bare conductor 16 exposed for termination in a connector having insulation displacing terminals or the like.

Figure 3B:
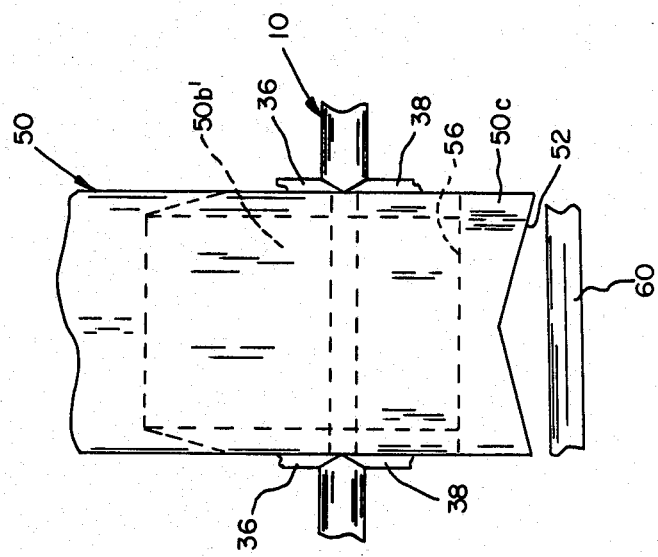

Referring now to FIGS. 3a and 3b, the transverse cutting of the outer jacket and the encapsulating medium is performed with a first pair of opposed cutting blades 36,38 having opposed cutting edges 40 with spaced semi-circular portions aligned with the cable conductors 12 and 16. When mated, edges 40 conform to the outer periphery of the insulation clad conductors 12 and the bare conductor 16. Cutting blades 36,38 somewhat resemble conventional blades used to strip insulation from the ends of an insulation clad conductor. In the present invention, however, blades 36,38 are mated (as indicated in FIG. 2b) to cut outer jacket 20 and encapsulating medium 18 along the full extent of the transverse lines 30,32 which define termination region 24.

Also shown in FIGS. 2 and 3, are notching blades 50 which are mounted together for a simultaneous movement in a downward direction during notching of cable assembly 10. A single notching blade 50 is provided for each conductor 12 and 16, and each notching blade 50 includes a single knife-like cutting edge 52 (ending in a piercing point), aligned with cable assembly 10 to cut jacket 20 and encapsulating medium 18 along spaced-apart lines 54, each lying in a plane which parallel to and immediately adjacent to one of the insulation clad conductors 12 and the bare conductors 16. Cutting along lines 54 produces discrete pliable slugs 60 of jacket and encapsulating material extending between adjacent conductors. Notching blades 50 further include an edge 56 which pushes against jacket 20 and medium 18, closely following slicing edge 52, to eject the slugs from region 24.

Preferably, adjacent slugs 60 are severed for independent movement by cutting edges 52. This produces a pliable slug that is easily separated from the conductor it surrounds. However, the cutting edges need not completely sever the slugs. For example, the bottom jacket portion and the medium portion underlying the conductors can be left unsevered, and the entire jacket and medium portions can be removed as an integral unit. In this alternative embodiment, cutting lines 54 are aligned parallel to conductors 12, to score the upper portions of the jacket and encapsulating medium. The cutting edges 52 are brought immediately adjacent to the outer surface of the conductor, at any radial orientation (see cut lines 54' of FIG. 5). In either embodiment, the cutting edge is brought close enough to the conductor (0.004 inches, in the example cited below) that an easily tearable weak spot is formed adjacent each conductor.

As indicated in the side sectional view of FIG. 3a, cutting edge 52 has a generally v-shaped inverted relief 62, to reduce the downward pressure exerted on a conductor during the notching process. Two spaced-apart pairs of cutting blades 36,38 are simultaneously actuated to form the two spaced apart lines 30,32.

Figure 2A:
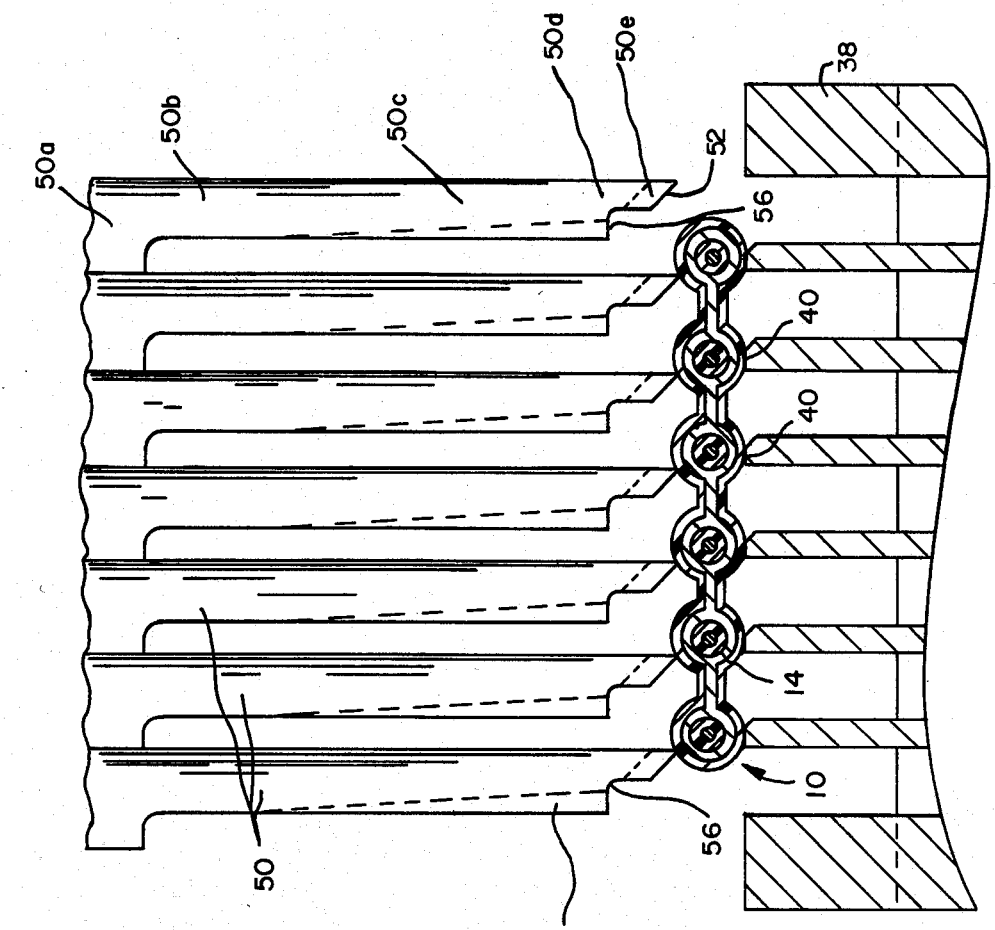
FIGS. 2a and 2b are transverse cross-sectional views of the cable of FIG. 1, showing operation of the cable notching apparatus of the present invention.
Figure 2B:
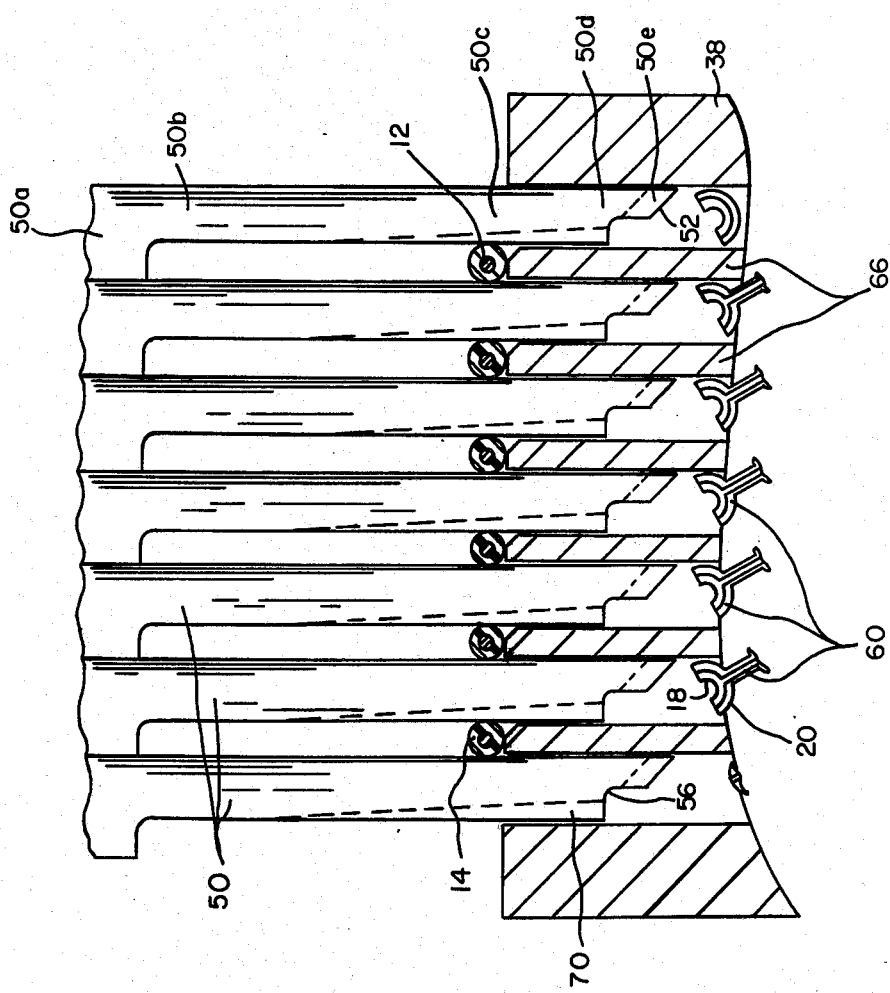

Referring to FIGS. 2a and 2b, the underside of each insulation clad conductor 14 and bare conductor 16 is supported by comb-like finger members 66. It is to be understood that during the notching of the present invention, cable assembly 10 is supported adjacent each conductor. The cavities formed between adjacent finger members 66 receive the lower ends of notching blades 50 as they are driven past cable assembly 1.

The following is an example of one particular embodiment of the present invention for a cable assembly wherein the conductors are arranged on 0.156 inch centerlines. Each conductor is designed to have an outer periphery of insulation cladding which is 0.050 inches thick. For convenience, the bare conductor 16 is also configured to have an outside diameter of 0.050 inches. Referring to FIG. 2a, the upper portion 50a of notching blade 50 a thickness of 0.156 inches, corresponding to the centerline spacing of the cable conductors. The lower necked-down portion 50b has a width of 0.098 inches, and to afford a maximum reliability in avoiding severing the outer insulation cladding 14, portion 50b is centered between adjacent conductors. This produces a clearance of 0.004 inches between each lateral blade edge 50b' and the insulation cladding 14 of conductor 12. It was found that this minimum clearance of 0.004 inches was the closest practical spacing that can be maintained between cutting blade 50 and an insulation clad conductor, given production tolerances of a flat ribbon cable construction.

According to the present invention a recess 70 cut into the width of lower blade portion 50c may be provided to accomodate deformed portions of slugs 60 as they are pushed downwardly between adjacent conductors. Recess 70 is conveniently formed with a grinding wheel, and has an upper rounded runout portion. In some applications, recess 70 was found to be necessary to carry slugs 60 away from adjacent conductors without imparting undue stresses causing conductor breakage. In the preferred embodiment, the recess portion 70 has a depth of 0.036 inches. The recess is intended primarily to accommodate that portion of jacket 20 and medium 18 extending from an upper edge of an insulation clad conductor 12 and the upper outer edge of the cable assembly 10, which in the prefered embodiment has an incremental thickness of 0.023 inches, the overall vertical thickness of assembly 10 being 0.096 inches.

At a further lower point 50d along cutting blade 50, a generally horizontal pushing edge, designated by the numeral 56, is located adjacent a still lower cutting portion 50e. In the preferred embodiment, a radius of 0.015 inches is formed between the upper extent of cutting portion 50e and pushing edge 56. The cutting edge 52 is formed at an angle of 45 degrees, as indicated in the cross-sectional views of FIGS. 2a and 2b.

In operation, the plurality of notching blades 50 are simultaneously advanced through assembly 10, with cutting edge 52 slicing jacket 20 and medium 18 along spaced apart parallel lines 54, which are parallel to and immediately adjacent to the insulated and bare conductors. This step forms a plurality of slugs 60 each having the length of termination region 24.

As notching blades 50 are continually advanced, pushing edges 56 thereof eject slugs 60 from between adjacent conductors to expose the insulated and bare conductors of termination region 24.

As indicated above, in an ideal arrangement, the cutting edges 52 could be aligned tangent to insulation cladding 14 and the outer surface of bare conductor 16. However, in a production environment, deviation in conductor centerline spacing, thickness of insulation cladding 14, and other factors require there be some minimal distance, or lateral separation, between the cut lines 54 and the tangent point of a conductor. In the preferred embodiment, cutting edges are placed immediately adjacent to a conductor, leaving a 0.004 inch thick wall of encapsulating medium 18, which is readily tearable as slug 60 is pushed past conductors 20. The distorting force applied to the conductor is negligible. If desired, cutting edge 52 can be aligned just inside the tangent point of a conductor, or may be aligned exactly therewith so as to form a slit in the edge of a slug 60 communicating with the insulation clad or bare conductor, whereby the conductor may pass through the slit during the pushing step.

It will be readily appreciated by those skilled in the art that the method and apparatus of the present invvention can be employed with conventional flat ribbon cables if a bare conductor termination region is desired. In either event, according to the present invention, each notching blade 50 generally comprises an elongated bar having a lower cable engaging surface with a pair of opposed sidewall surfaces extending upwardly therefrom. The lower cable engaging surface has a first downwardly extending cutting edge 52 and a second recessed pushing edge or surface 56. The adjacent cutting and pushing edges form a smooth continuous cable engaging surface (as indicated by the aforementioned 0.015 inch radius transition region).

We claim:

1. A method of preparing a flat multi-conductor cable by removing material between conductors to form a termination region, said cable including a planar array of axially extending, spaced-apart, parallel conductors with an encapsulating medium including first portions completely surrounding each conductor and second portions filling the spaces therebetween, the method comprising the steps of:

forming a pair of longitudinally spaced-apart cuts in both said first and second portions of said encapsulating medium along two spaced-apart lines generally transverse to said conductors, to define the length of said region;

forming only a single longitudinally extending cut in said encapsulating medium immediately adjacent to each of said conductors, whereby a plurality of slugs of said length are produced, said slugs comprising portions of said encapsulating medium; and pushing said slugs from between adjacent conductors to expose said conductors in said termination region.

2. The method of claim 1 wherein said step of forming a longitudinal cut forms a weakened portion in said slug for passage of said conductor therethrough during said pushing step.

3. The method of claim 1 wherein said step of forming a longitudinal cut severs adjacent slugs for independent movement during said pushing step.

4. The method of claim 1 wherein said step of forming a longitudinal cut and said pushing step are performed by passing a tool having a single leading cutting edge and an adjacent pushing edge between adjacent conductors.

5. The method of claim 1 wherein said step of forming a longitudinal cut forms a slit in said slug communicating with said conductor whereby said conductor passes through said slit during said pushing step.

6. A method of notching a multi-conductor cable having at least three conductors and including cable material surrounding and extending between the conductors of the cable, said method comprising:

cutting the cable material transversely along two spacedapart lines intersecting the conductors;

cutting the cable material longitudinally only once adjacent each conductor to form one cut adjacent each conductor through which the conductors can pass; and pushing the cable material away from the conductors while permitting the conductors to pass through said cuts.

7. A method of preparing a flat shielded multi-conductor cable by removing material between conductors to form a termination region, said cable including a planar array of axially extending, spaced-apart, parallel conductors with a conductive shielding medium having first portions completely surrounding each conductor and having second portions filling the spaces therebetween, and an outer jacket surrounding said shielding medium, the method comprising the steps of:

forming a pair of longitudinally spaced-apart cuts in both said first and second portions of shielding medium and said outer jacket along two spaced-apart lines generally transverse to said conductors, to define the length of said region;

forming only a single longitudinal cut in said jacket and said shielding medium immediately adjacent to each of said conductors, whereby a plurality of slugs of said length are produced, said slugs comprising portions of said jacket and said shielding medium; and pushing said slugs from between adjacent conductors to expose said conductors in said termination region.

8. The method of claim 7 wherein at least one of said conductors has an outer covering of insulating material, and said step of forming a longitudinal cut comprises the step of cutting said jacket and said shielding medium parallel to and immediately adjacent to said outer covering.

9. The method of claim 8 wherein said step of forming a longitudinal cut forms a weakened portion in said slug for passage of said insulated conductor therethrough during pushing step.

10. The method of claim 9 wherein said step of forming a longitudinal cut forms a slit in said slug communicating with said conductor covering, whereby said conductor passes through said slit during said pushing step.

11. The method of claim 7 wherein said step of forming a longitudinal cut severs adjacent slugs for independent movement during said pushing step.

12. The method of claim 7 wherein said step of forming a longitudinal cut and said pushing step are performed by passing a tool having a single cutting edge and an adjacent pushing edge between adjacent conductors.

13. An apparatus for preparing a flat shielded multi-conductor cable which removes material between conductors to form a termination region, said cable including a planar array of axially extending, spaced-apart, parallel conductors with a conductive shielding medium having first portions completely surrounding each conductor and second portions filling the spaces therebetween, and an outer jacket surrounding said shielding medium, the apparatus comprising:

first blade means for cutting said outer jacket and said first and second portions of said shielding medium continuously along two spaced-apart lines generally transverse to said conductors to define the length of said region;

a plurality of second blade means for cutting said jacket and said shielding medium along a plurality of spaced-apart longitudinal lines parallel to said conductors, only a single said line being immediately adjacent to each of said conductors whereby a plurality of slugs of said length are produced, said slugs comprising portions of said jacket and said shielding medium; and means for pushing said slugs from between adjacent conductors to expose said conductors in said termination region.

14. The apparatus of claim 13 further comprising means contacting a first surface of said cable for supporting said termination region of said cable, said second blade means and said pushing means together comprising a unitary tool member having a first slicing edge extending the length of said termination region and an adjacent pushing edge, said tool having a width generally corresponding to the distance between adjacent conductors.

15. The apparatus of claim 14 further comprising a plurality of said tool members, and means for simultaneously moving said plurality of said tool members between said conductors, whereby each of said slugs are simultaneously produced and pushed from said termination region.

16. The apparatus of claim 14 wherein said tool member comprises an elongated bar having a lower cable engaging surface with a pair of opposed sidewall surfaces extending upwardly therefrom, said cable engaging surface comprising a first extended cutting edge, and a second recessed pushing surface, said cutting edge and said pushing surface together forming a smooth continuous cable engaging surface.

17. An apparatus for preparing a flat multiconductor cable which removes material between conductors to form a termination region, said cable including a planar array of axially extending, spaced-apart, parallel conductors with an encapsulating medium completely surrounding each conductor and filling the spaces therebetween, the apparatus comprising:

means for cutting said medium along two spaced-apart lines generally transverse to said conductors to define the length of said region;

a plurality of cutting blades equal in number to said conductors for cutting said medium along an equal number of spaced-apart lines parallel to and each immediately adjacent to one of said conductors whereby a plurality of slugs of said length are produced; and means for pushing said slugs from between adjacent conductors to expose said conductors in said termination region.

* * * * *